Nov. 15, 1927.

G. H. ZOUCK 1,648,930

FLEXIBLE JOINT AND CONNECTION

Filed Dec. 27, 1923

WITNESS
Gustav Genzlinger

INVENTOR
G. H. Zouck
BY
Synnestvedt & Lechner
ATTORNEYS

Patented Nov. 15, 1927.

1,648,930

UNITED STATES PATENT OFFICE.

GEORGE H. ZOUCK, OF ORANGE, NEW JERSEY, ASSIGNOR TO FRANKLIN RAILWAY SUPPLY COMPANY, A CORPORATION OF DELAWARE.

FLEXIBLE JOINT AND CONNECTION.

Application filed December 27, 1923. Serial No. 682,849.

My invention relates to flexible joints and connections, and is especially advantageous for connections of "all metal" construction, such as are much used for the steam and air lines between railway locomotives and tenders, etc. I aim to improve the fluid tightness of such connections, and to reduce their friction and wear; to reduce stresses and failures in service; to facilitate installation or removal of the connections, and obviate risks of injury to the parts by improper methods of assembling; and to improve the construction and serviceability of such connections in various ways.

How these and other advantages can be realized in a novel manner through my invention will appear from my description hereinafter of a selected and preferred embodiment.

In the drawings, Fig. 1 is a side view of a flexible connection between a locomotive and its tender conveniently embodying my invention.

Figure 1:
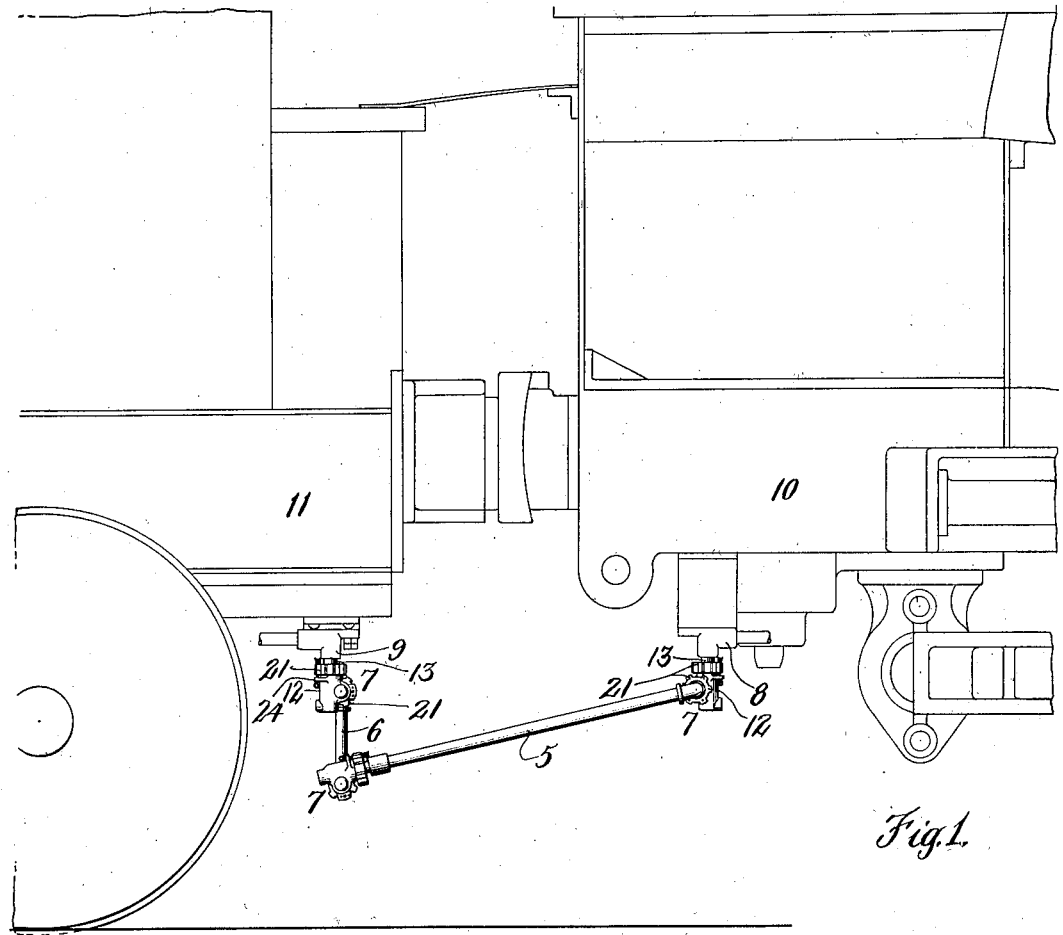

The connection shown in Fig. 1 comprises lengths of metal pipe 5 and 6 connected together by one or more swivel joints 7, and also connected by swivel joints 7, 7 to fittings 8 and 9 on the locomotive 10 and on the tender 11, respectively. The various individual swivels are so arranged that the connection yields freely, by bending at one or more of them, to every possible relative motion of locomotive and tender in service. In the present instance, the various joints 7 are all double, and exact counterparts of one another; and the individual swivels of each such joint 7 are also just alike.

Figures 2, 3:
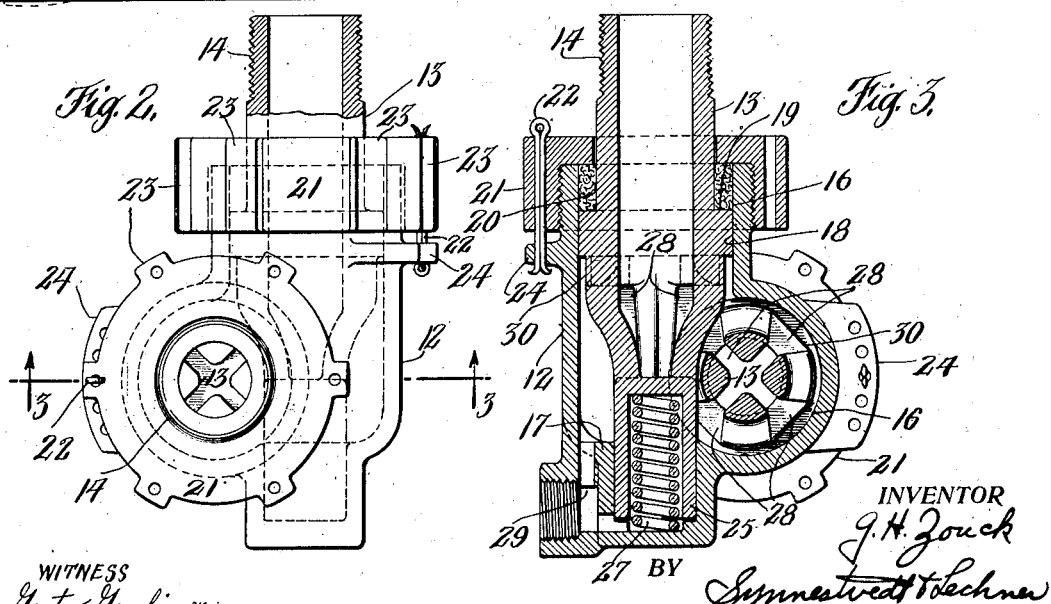
Fig. 2 is a side view of a double joint such as shown in Fig. 1, on a larger scale, with one member partly broken away and in section.
Fig. 3 shows a horizontal section, taken as indicated by the line 3—3 in Fig. 2.

Referring, now, to Figs. 2 and 3, it will be seen that such a joint 7 comprises a hollow body 12 and, for each of the swivels, a connecting member or "sleeve" part 13 adapted to turn relative to the body without leakage. Preferably, each of the parts 13 is screw-threaded for convenience in attaching it to other parts: e. g., one of the parts 13 may be externally threaded, as at 14, and the other internally threaded. In order to obviate or minimize tilting of a part 13 relative to the body 12, they are rotatably intervene engaged at substantially separated coaxial bearings, here shown as comprising a round bore 16 at one end of the body 12 and another internal bearing 17 at its other end, of smaller size.

Preferably, the bearing portion 25 of the part 13 that coacts with the body bearing 17 is externally engaged with the latter. The external bearing portion 18 of the part 13 that coacts with the bore 16 is laterally shouldered at 19 to engage a suitable packing 20 held in place in the outer end of the bore 13 by a nut 21 screwed on this end of the body, as usual. Accidental unscrewing of this nut 21, as by vibration, may be prevented by a cotter pin 22 extending through one of several holes in lugs 23 on the nut and in a flange 24 on the body 12. A helical compression spring 27 may be provided for urging the shoulder 19 against the packing 20, to keep the joint tight when pressure is not on the line.

In the present instance, the effective overall length of each swivel 7 (i. e., the axial distance from the outside of one of its separated bearings at 16, 18 to the outside of the other at 17, 25) is several times the large swivel or bearing diameter at 16, 18, so that any real relative tilting or cocking of the parts 12, 13 is impossible.

Between its bearing portions 18 and 25, the part 13 communicates with the interior of the body 12, through a number of radial openings 28 extending lengthwise of the part 13. In the present instance the spring 27 is arranged in a recess or chamber in the bearing 25 of the member 13. The spring chamber is cut off or occluded from the interior of the part 13 by a transverse web or diaphragm located below the openings 28, and the spring thus protected from the direct flow of the steam or other fluid. Preferably, the reduction in size of the part 13 as between its bearings 18 and 25 is somewhat gradual, rather than abrupt. As shown, the aggregate cross sectional area of the openings 28 considerably exceeds that of the interior of the part 13 itself, so that the frictional resistance to the flow of fluid through the joint 7 is kept down to the minimum. In the present instance, the body 12 is provided with a drainage opening or vent 29 alongside its bearing 17, adapted to be normally closed by any suitable means (not shown),—such as an automatic drain valve or a screw plug. As shown in Fig. 3, the intermediate portion of the member 13 is somewhat reduced in size at 30,—between its bearing 18 and its opening 28,—to afford a suitable place for external engagement by a tool for turning the part 13 to screw it fast to some other part at 14, or to unscrew it. This portion 30 may preferably be squared sufficiently to afford a secure grip for an ordinary wrench.

As shown in Figs. 2 and 3, the axes of the rotatable connecting members 13, 13 of a double joint 7, 7 lie at an angle to one another,—at right angles in fact,—and the axis of each is located at an intermediate point in the effective length of the other, about midway between its coaxial body bearings 16, 17. Also, the axes of the members 13, 13 of each double joint 7 are brought extremely close together: in fact, each of these members 13, 13 extends across one end of the bore 16 belonging to the other such member 13, in the space afforded by the reduction in size of such other member 13 as between its bearings 17, 25. In other words, each swivel 7 is swung about at midlength of its associate swivel 7, and just about as close to it as possible.

Bearing in mind that the usual type of all metal joint consists essentially of an elbow fitting with a shouldered connecting sleeve rotatable in each end, various advantages of the type of joint just described over this prior type will readily become apparent.

As above intimated, the relatively great overall length of a swivel 7 as compared with the diameters of its larger bearings obviates "cocking" and minimizes tilting of the parts 12, 13 relative to one another; and this naturally allows a harder gasket 20 to be used without risk that contact may be lost between the gasket and its shoulder 19,—thus reducing wear on the gasket and liability of leakage in service. This increased swivel length (increased, that is, as compared with the effective swivel length in the ordinary type of joint mentioned above) is secured without any substantial increase in the important external dimensions of the joint 7, 7, owing to the closeness of the swivel axes and their location each approximately at mid length of the other: indeed, the important external dimensions of the joint may even be reduced somewhat as compared with the older type. Owing, also, to these relative locations of the swivels, the line of action of the force brought to bear on a double joint by one of its connections lies about at mid length of its other swivel, between the bearings of such other swivel, and closer to its attachment at 14 than in the standard joint. In a word, therefore, twisting moments, bending moments, and the tendency toward relative tilting or coking of parts are all greatly reduced, as well as the breaking stresses.

Moreover, whereas in the ordinary joint the only provision for screwing and unscrewing the sleeve is by engagement of a bar with internal lugs in the sleeve, so that careless workmen are tempted to apply a Stillson wrench externally, either to the bearing 18 or to the superjacent surface of the sleeve,—thus roughening surfaces that should be smooth to assure free action and minimum wear,—the portion 30 of the connecting part 13 described above affords a safe and convenient hold for an ordinary wrench, and thus eliminates the temptation.

I claim:

1. A swivel joint comprising a body portion, a pair of hollow connecting members swivelled therein, each connecting member having a pair of coaxial cylindrical bearings of different diameters, the bearing of smaller diameter of each member being located at the end of the member farthest removed from its connection end, and each member having a conical neck portion connecting its cylindrical bearing portions, the base of said conical neck being adjacent the larger bearing, said connecting portions having openings through their necks communicating with the interior of the body and said members being so disposed that the neck portion of one is adjacent the neck portion of the other.

2. In a swivel joint of the character described, a swivel connecting member comprising a cylindrical sleeve-like portion having a bearing surface, a reduced portion adjacent said bearing configured to receive a wrench, a second cylindrical portion of smaller diameter also provided with a bearing surface and recessed at one end to house a spring, and ribs, substantially defining a cone, connecting said cylindrical portions together whereby openings from the interior of the sleeve-like portion are provided.

3. A swivel joint comprising a housing and a pair of hollow members swivelled therein; each swivelled member comprising a hollow connection portion having a bearing surface, a conical portion provided with openings communicating with the interior of said housing, the base of said conical portion being adjacent said bearing, and a bearing portion adjacent the small end of said conical portion; said members being positioned in the housing at right angles to one another with the small ends of their conical portions substantially adjacent.

In testimony whereof, I have hereunto signed my name.

G. H. ZOUCK.